United States Patent [19]

Kellner

[11] 4,319,816
[45] Mar. 16, 1982

[54] PRISM VIEWFINDER FOR REFLEX CAMERAS WITH BUILT-IN LIGHT METER

[76] Inventor: Ferdinand Kellner, Spittelmüllerstr. 6, D-8940 Memmingen, Fed. Rep. of Germany

[21] Appl. No.: 216,005

[22] Filed: Dec. 12, 1980

[30] Foreign Application Priority Data

Dec. 22, 1979 [DE] Fed. Rep. of Germany ....... 2952207

[51] Int. Cl.³ .............................................. G03B 7/099
[52] U.S. Cl. ...................................... 354/56; 354/152
[58] Field of Search ................ 354/23 R, 56, 152, 155

[56] References Cited

U.S. PATENT DOCUMENTS

| | | | |
|---|---|---|---|
| 3,842,424 | 10/1974 | Tsunekawa et al. | 354/152 X |
| 4,021,823 | 5/1977 | Mujata | 354/155 X |
| 4,134,654 | 1/1979 | Murakami et al. | 354/23 D X |

*Primary Examiner*—Michael L. Gellner
*Attorney, Agent, or Firm*—Holman & Stern

[57] ABSTRACT

An improved prism viewfinder wherein in the region of the beam-incidence surface of the prism there is provided a partially transmitting mirrored surface which partially reflects the light beam of an angle somewhat greater than 90° onto a light-sensing organ disposed adjacent to the prism.

10 Claims, 5 Drawing Figures

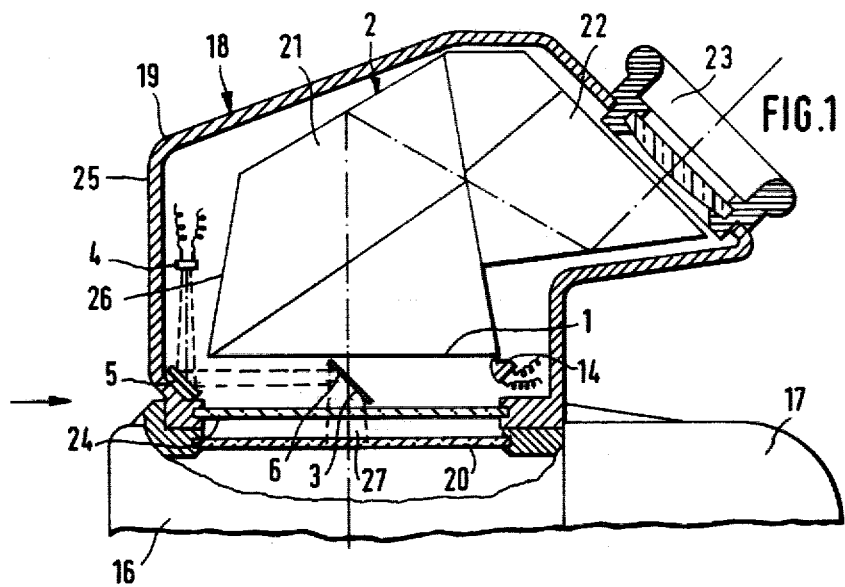
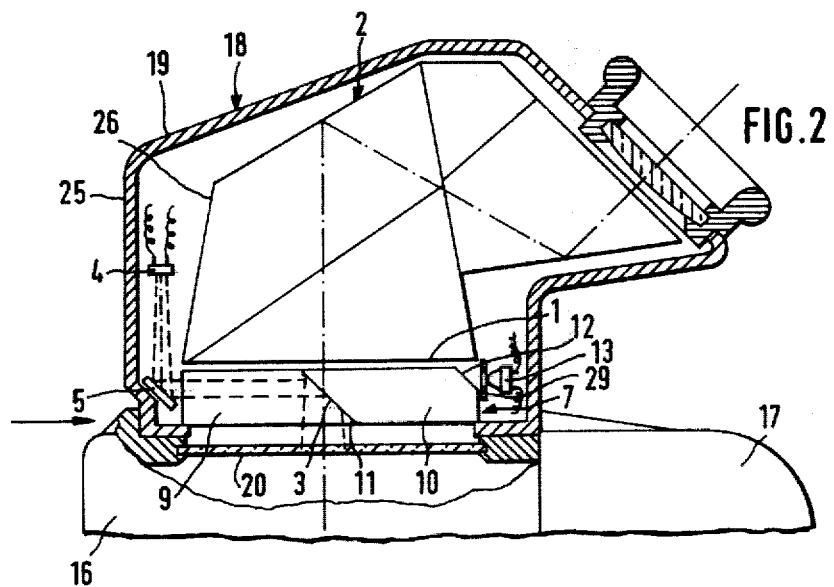

PRISM VIEWFINDER FOR REFLEX CAMERAS WITH BUILT-IN LIGHT METER

BACKGROUND OF THE INVENTION

1. Field of the Invention

The invention concerns a prism viewfinder with an arrangement for selective light measurement, whereby opposite to the beam-incidence surface, the prism has an intersection or bevel edge and a plane reflecting surface associated with said edge, whereby said reflecting surface directs the path of the beam to about a 45° angle leaving the prism, with respect to the entry direction.

2. Description of the Prior Art

To provide, in a reflex camera, an arrangement for selective light measurement, it is necessary to select a defined segment of the image and to direct the light from this segment onto a light meter. A means of accomplishing this is known according to which a swinging mirror is provided which has a region which partially passes the incident light, and the penetrating light is then deflected in order to throw it onto a light-sensing organ, which organ as a rule is disposed opposite the entrance opening of the prism viewfinder of the reflex camera.

In the above type of design, the swinging mirror has additional equipment on it which increases its mass, and this is undesirable. In addition, this type of design requires as a precondition, that an appropriate selective light meter arrangement be afforded in the camera.

There are also known prism viewfinder reflex cameras of the type initially mentioned above which in particular have a construction design which allows a separation of the viewfinder from the mirror compartment of the camera. These viewfinders, which permit a convenient view into the prism, have relatively large dimensions, for which there are repercussions in the increased space requirements of the camera and its associated parts.

SUMMARY OF THE INVENTION

This invention provides a prism viewfinder having an arrangement for selective light measurement, which viewfinder is especially suited to be added to a camera without any modifications to the camera being needed to accommodate it. A highly desirable aspect of this invention is that the space requirement for the selective light measurement arrangement is as small as possible.

To accomplish the aims of this invention, starting from a prism viewfinder of the type described above, it is proposed according to this invention that in the region of the beam-incidence surface of the prism there is provided a partially transmitting mirrored surface (i.e., a "half-silvered" surface) which partially reflects the light beam approximately parallel to the beam-incidence surface onto a light-sensing organ disposed adjacent to the prism.

It is a particular advantage according to this invention that the partially transmitting mirrored surface which deflects the light beam which is to be measured to the light-measuring means, ultimately, at least, lies in close proximity to the ground glass plate. This short distance to the ground glass plate enables a comparatively exact measurement, because the disturbing influence of other light beams is sharply reduced or eliminated; and the arrangement also allows relatively simple means to be employed for the deflection of the light beams which are to be measured.

It is a further advantage according to this invention that the devices for the selective light measurement be integrated into the prism viewfinder, thus not requiring any modification to the camera. The mounting of all the parts to stationary elements is an important advantage over similar arrangements in the prior art.

In the application of the invention, a space adjacent to the prism can easily be found which is suitable for accommodating the light-sensing organ. This space may be, for example, on the object side of the prism. A lateral disposition, on the right or left, is also possible.

In general, it is advisable for the incident light beam and the light beam reflected at the partially transmitting mirrored surface to be at an angle to each other which is somewhat greater than 90°. In this way, the light measurement arrangement, and thus, for example, the light-sensing means or the intermediate optical elements, is in a position so as not to interfere with the configuration of the connecting means between the prism viewfinder on the one hand and the camera on the other.

It is preferred for the light beam reflected at the surface to fall on a substantially reflecting mirror whose surface is basically parallel to the partially transmitting mirrored surface whereby the light is reflected to impinge on the light-sensing means, so that the light-sensing means can be disposed adjacent to the prism at a certain distance from the beam-incidence opening of the prism.

There are a variety of construction designs possible according to this invention for the arrangement and configuration of the partially transmitting mirrored surface. This surface may be, for example, a segment on a plate of light-transmitting material, such as glass. Since, however, the thickness of the glass might result in a visible image on the ground glass plate, it is preferred for the partially transmitting mirrored surface to comprise a film or foil strip which will be practically invisible due to its thinness. Any reasonable deformation of the film or foil strip which may occur is of no particular disadvantage, since it would not impair the image on the ground glass plate nor would it detract from the accuracy of the light measurement.

According to another embodiment of this invention, a relatively thick glass plate is provided which comprises two cemented pieces joined at an angle. The partially transmitting mirrored surface is then mounted in the angled cement gap.

The glass plate may also be used for imaging the meter indicator. For this purpose, an angled mirror surface is provided at the edge of the glass plate, via which mirror surface a diode indicator (for example) may be imaged. If a film or foil strip, as mentioned above, is used, there is a space under the prism where suitable indicator elements may also be mounted.

According to another variant of this invention, the glass plate is attached to the prism with a cement gap, thus becoming part of the prism. With this construction design, no extra space at all is needed for mounting the partially transmitting mirrored surface, and space is only required to accommodate the light-sensing organ and its associated deflecting mirror.

It is advantageous for the glass plate to form the cover for the beam-incidence opening of the prism viewfinder.

BRIEF DESCRIPTION OF THE DRAWINGS

A few example embodiments of the invention are depicted schematically in the drawings, wherein:

FIG. 1 shows a cross section of a prism viewfinder according to this invention;

FIGS. 2 through 4 show sections through different embodiments of this invention.

DESCRIPTION OF THE PREFERRED EMBODIMENTS

Figure 3:
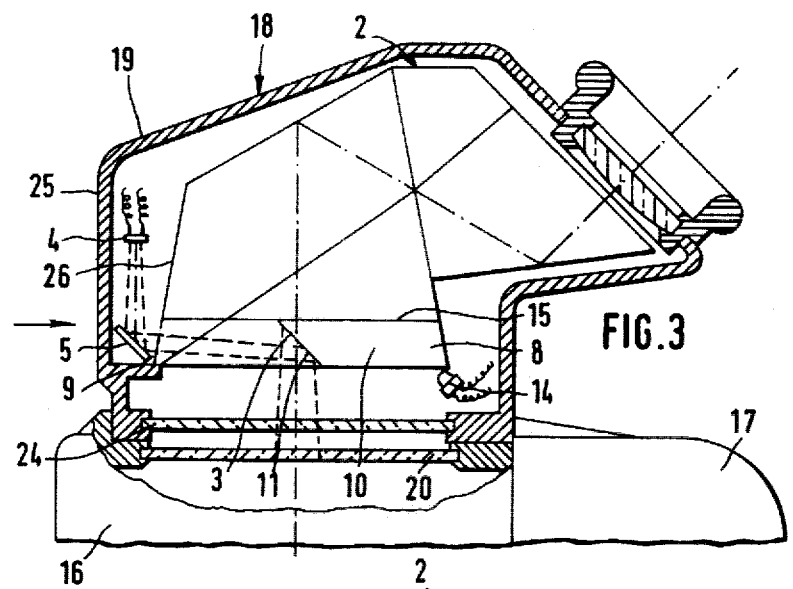

In FIGS. 1–4, a camera 16 is shown in part which has a replaceable cartridge 17 attached to it. A prism viewfinder 18 is mounted on camera 16, with the essential parts of said viewfinder being disposed interior to housing 19.

The ground glass plate, on which the ground glass image is produced, is designated 20.

Prism 2, a compound prism basically comprising two prism parts 21 and 22, is disposed in housing 19. The constructive design of this prism is in accordance with, for example, German Pat. No. 1,266,630. The eyepiece, through which the ground glass image is viewed, is designated 23.

Figure 5:
FIG. 5 shows a feature of the invention which may be employed in, for example, the embodiments of FIGS. 1 and 4.

It is seen in the example embodiment of FIG. 1, that the beam-incidence opening of the prism viewfinder 18 is sealed by a thin glass plate 24 which prevents dust or other contamination. A film strip 6 is disposed between this thin glass plate 24 and the beam-incidence surface 1 of the prism 2, which strip 6 is held at an angle to the beam-incidence surface 1. A detailed representation of the holding means is omitted. Film strip 6 has a shape such as is shown for example in FIG. 5. In approximately the middle of said film strip, there is a partially transmitting mirrored surface 3, whereby a first part of the beam penetrates into the prism 2 and a second part is reflected sideways to substantially reflecting mirror surface 5.

This second part of the light beam passes from substantially reflecting mirror 5 to light-sensing organ 4 inside housing 10.

By this arrangement, one may use, for example, the space between the vertical wall 25 of housing 19 and the inclined surface 26 of prism 2.

As a result of the reflecting away of part of the light beam from the region 27 of ground glass plate 20, there is a corresponding slight darkening of the viewfinder image. This darkening is nonetheless not of major consequence, and further has the advantage of making it clear in the viewfinder, which area of the image it is that is being measured.

In the embodiment of FIG. 1, the measurement result is registered by a diode device 14 and is visible in the viewfinder image.

Figure 4:
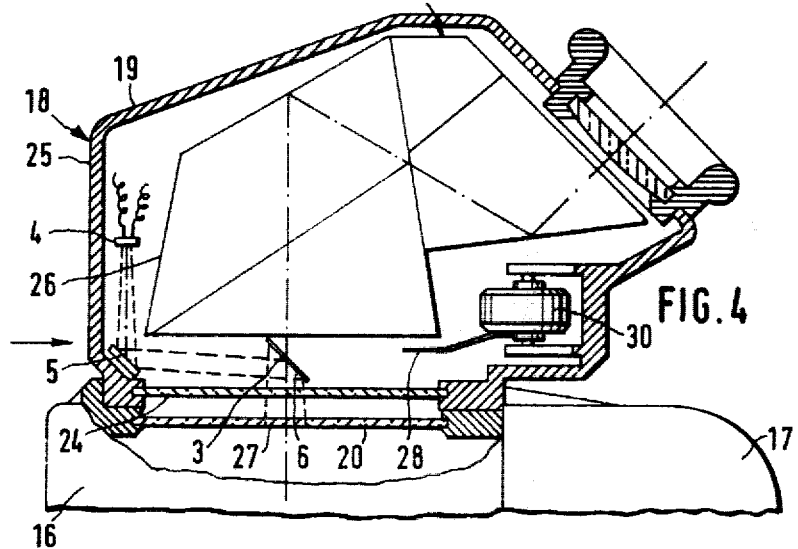

In the embodiment of FIG. 4, the diode device 14 of FIG. 1 is replaced by a suspended rotating coil instrument 30, with its needle 28 extending into the space between the beam-incidence surface 1 and the thin glass plate 24.

In the embodiment of FIG. 2, a thick two-piece glass plate 7 is provided, comprising parts 9 and 10 which join to form a planar sheet. The cement gap 11 accepts the partially transmitting mirrored surface 3. With this construction design, the mounting of glass plate 24 is obviated, and the interior of housing 19 is sealed against dust and other contamination by two-piece glass plate 7. Glass plate 7 has in inclined mirror surface 12 at one end; and the measurement result can be imaged in the viewfinder image by means of measurement result diode 13, which may have, for example, a diaphragm 29 provided in front of it.

In the embodiment of FIG. 3, the glass plate 8 is part of the prism 2 and is attached to said prism via cement gap 15. This provides a construction which is very space-saving, although thin glass plate 24 is preferably present to prevent dust or other contamination.

Obvious variations of the above embodiments, not disclosed as having critical limitations, are also incorporated within this invention.

I claim:

1. In a prism viewfinder for mirror reflex cameras having an arrangement for selective light measurement wherein a housing has mounted therein a compound prism which has a bevel edge opposite to its beam-incidence surface and a plane reflecting surface associated with said edge, and wherein said reflecting surface directs the path of a beam leaving said prism at about a 45° angle to its incidence direction, the improvement comprising:

a partially transmitting reflecting means comprising a partially transmitting mirrored surface mounted within the housing in the region of the beam-incidence surface of the prism at an angle such that the incident light beam and the reflected light beam are at an angle to each other somewhat greater than 90°; and light sensing means mounted within the housing and adjacent to the prism disposed so that the reflected light beam impinges on said light sensing means.

2. The improvement of claim 1 wherein a substantially reflecting mirror is provided mounted within the housing whose surface is approximately parallel to the partially transmitting mirrored surface so that the reflected light beam impinges on said substantially reflecting mirror and then is further reflected to impinge on the light sensing means.

3. The improvement of claim 2 wherein the partially transmitting mirrored surface comprises a segment on a strip of light-transmitting material.

4. The improvement of claim 3 wherein the partially transmitting mirrored surface is a film strip.

5. The improvement of claim 2 wherein the measurement result is registered by a diode device visible in the viewfinder image.

6. The improvement of claim 2 wherein the measurement result is registered by a rotating coil instrument having an indicating needle visible in the viewfinder image.

7. The improvement of claim 2 or 3 wherein a thick two-piece glass plate is provided mounted within the housing between the prism beam incidence surface and the light source, said plate comprising two cemented pieces forming a planar sheet with the partially transmitting mirrored surface being disposed in the cemented gap between the two pieces, which gap is appropriately inclined.

8. The improvement of claim 7 wherein the two-piece glass plate is cemented to the beam incidence surface and is thus integral with the prism, and a thin glass plate is provided at the point of entry of the light source to seal the prism viewfinder.

9. The improvement of claim 7 wherein the two-piece glass plate is mounted within the housing at the point of entry of the light source so as to seal the prism viewfinder.

10. The improvement of claim 9 wherein the two-piece glass plate has an inclined mirrored surface at one end located so that a measurement result diode mounted within the housing may be imaged in the viewfinder.

* * * * *